Feb. 20, 1968
M. E. MUSSER
3,369,646
CONVEYOR APPARATUS
Filed April 11, 1966
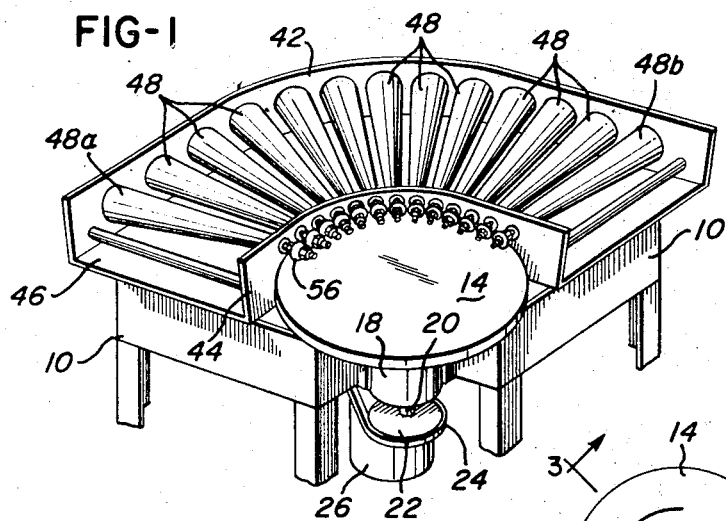
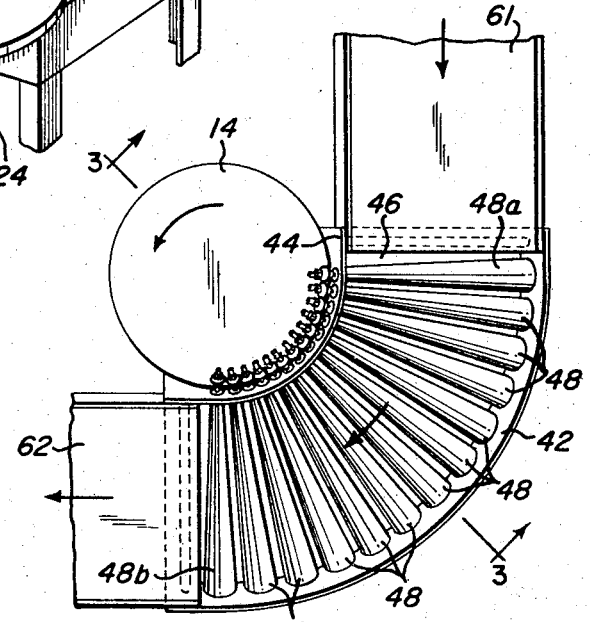
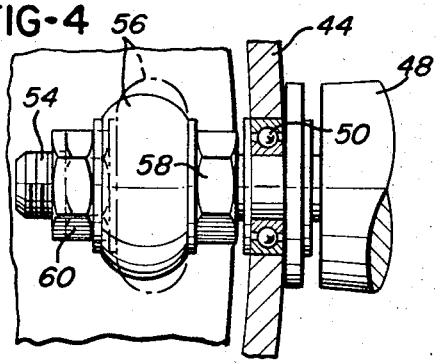
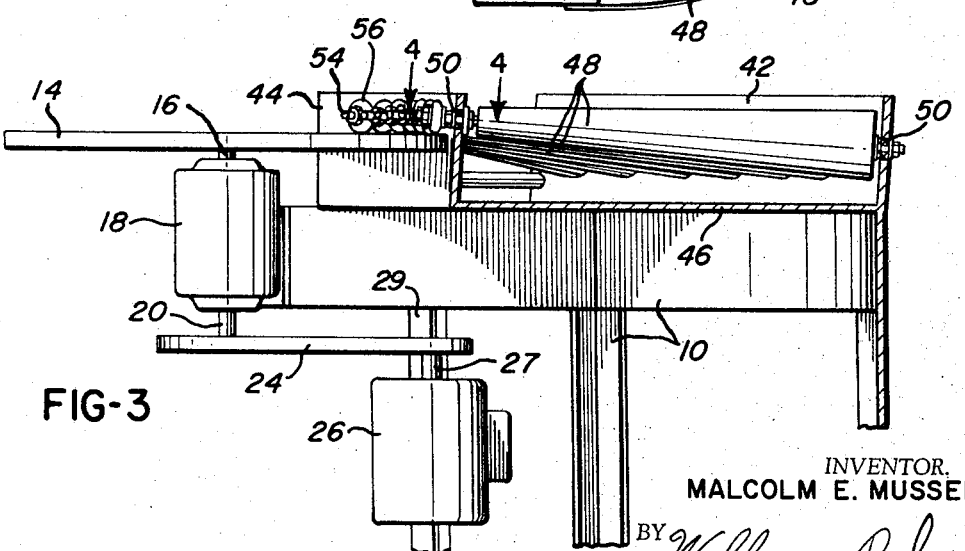
INVENTOR.
MALCOLM E. MUSSER
BY *William R Jacox*
ATTORNEY

United States Patent Office 3,369,646
Patented Feb. 20, 1968

3,369,646
CONVEYOR APPARATUS
Malcolm E. Musser, c/o Musser, Inc.,
Jackson Center, Ohio 45334
Filed Apr. 11, 1966, Ser. No. 541,744
2 Claims. (Cl. 198—127)

ABSTRACT OF THE DISCLOSURE

This invention relates to conveyor apparatus. The invention relates more particularly to conveyor apparatus which is capable of movement of articles from a given line of movement to a line of movement which is angular with respect to the given line of movement.

Background of the invention

Many types of industry of fields of merchandising or business or the like have need for a conveyor which is capable of changing the line of movement of articles which are moved horizontally from one location to another location.

An object of this invention is to provide curved section conveyor apparatus which does not require the use of gear members or the like.

Another object of this invention is to provide such conveyor apparatus which can be constructed at relatively low cost and which is long-lived.

Other objects and advantages reside in the construction of the invention, combinations thereof, the method of manufacture, and the mode of operation, as will become more apparent from the following description.

In the drawing:

FIGURE 1 is a perspective view of conveyor apparatus of this invention.

FIGURE 2 is a top plan view of conveyor apparatus of this invention.

FIGURE 3 is an enlarged sectional view taken substantially on line 3—3 of FIGURE 2.

FIGURE 4 is a greatly enlarged sectional view taken substantially on line 4—4 of FIGURE 3.

Referring to the drawing in detail, conveyor apparatus of this invention comprises any suitable support structure 10.

The support structure 10 supports a rotary member 14 which has a substantially coplanar upper surface, herein shown as being horizontal. The rotary member 14 is shown attached to a shaft 16 for rotation thereby.

The shaft 16 extends upwardly from a speed changer unit 18 which may be employed, if desired. The speed changer unit 18 is attached to the support structure 10. The speed changer unit 18 has a shaft 20 which carries a pulley wheel 22 which is rotatably driven by a belt or chain 24 which is driven by a motor unit 26. The motor unit 26 has an output shaft 27. The motor unit 26 is attached to the support structure 10 by means of a bracket 29.

The support structure 10 also supports an outer curved carrier 42 and an inner curved carrier 44. The curved carriers 42 and 44 are shown as being at opposite sides of a floor 46. The carrier members 42 and 44 rotatably support a plurality of roller members 48. Bearing members 50 are shown in supporting relationship to each roller member 48 at opposite end portions thereof. Each of the roller members 48 is tapered and has a smaller diameter portion adjacent the carrier 44 and a larger diameter portion adjacent the carrier 42. Peferably, the roller members 48 are supported by the carriers 42 and 44 so that the upper part of all of the roller members 48 is within the same plane, preferably a horizontal plane.

The longitudinal axis of each roller member 48 extends toward the axis of rotation of the rotary member 14. Each roller member 48 has a shaft portion 54 which extends from the inner carrier 44 to a position above the rotary member 14. The shaft portion 54 has a wheel member 56 or the like carried thereby for rotation therewith. The wheel member 56 is preferably of elastomeric material or the like and is clamped between an inner nut 58 and an outer nut 60 which are threadedly attached to the shaft portion 54. Each wheel member 56 is in engagement with the coplanar surface of the rotary member 14. The effective diameter of each wheel member 56 can be changed by changing the spacing between the nuts 58 and 60, as illustrated in FIGURE 4.

Herein, a roller member 48a is shown at the entrance portion of the conveyor apparatus and a roller member 48b is shown at the exit portion of the conveyor apparatus.

A conveyor belt 61 or the like is shown disposed adjacent the roller member 48a for movement of articles thereto. A conveyor belt 62 or the like is shown adjacent the roller member 48b for movement of articles in a direction therefrom, as illustrated in FIGURE 2. Herein the roller members 48 are arranged so that the conveyor belts 61 and 62, which move articles thereto and therefrom, are normal one with respect to the other. However, it is to be understood that the roller members 48 may be arranged so that the line of movement of articles at the entrance portion of the conveyor apparatus is at any other suitable angle with respect to the line of movement of articles from the exit portion of the conveyor apparatus.

It is to be understood that rotation of the rotary member 14 causes rotation of the roller members 48. Therefore, articles move from one roller member 48 to the next roller member 48 as the roller members 48 rotate. Therefore, an article moving to the roller member 48a is moved transversely with respect to the roller member 48a as the roller member 48a rotates. The article moves from the roller member 48a to the next adjacent roller member 48 and is successively moved from one roller member 48 to the next roller member 48. Due to the fact that the upper portion of all of the roller members 48 is in the same plane, each article which is moved by the roller members 48 remains at the same relative position between the carriers 42 and 44 during its travel from the roller member 48a to the roller member 48b. Thus, the article is moved from the roller member 48b at the same given position with respect to the carriers 42 and 44 as the article was moved to the roller member 48a. However, the direction of movement of the article changes in its movement from the roller member 48a to the roller member 48b.

Although the preferred embodiment of the device has been described, it will be understood that within the purview of this invention various changes may be made in the form, details, proportions and arrangement of parts, the combination thereof and mode of operation, which generally stated consist in a device capable of carrying out the objects set forth, as disclosed and defined in the appended claims.

The invention having thus been described, the following is claimed:

1. Conveyor apparatus for movement of articles from a given line of movement to a line of movement which is angular with respect to the given line of movement, the apparatus being of the type having support structure, a plurality of tapered roller members rotatably carried by the support structure, each of the tapered roller members having a smaller diameter at one end thereof and a larger diameter at the other end thereof, each of the roller members having a longitudinal axis which extends toward a given central point with the smaller diameter end of each of the roller members being closer to the central point than the larger diameter end thereof, the upper part of the roller members being substantially horizontal, the improvement comprising:

a plurality of wheel members, means attaching a wheel member to each roller member adjacent the smaller diameter end thereof and coaxial therewith, said means comprising a shaft, a pair of nut members attached to the shaft, the wheel member being snugly disposed between the pair of nut members, the wheel member being of elastomeric material so that changing the spacing between the nut members changes the effective diameter of the wheel member, a rotary drive member rotatable about a substantially vertical axis wihch passes through said given central point, the rotary drive member having a substantially coplanar surface which is in engagement with the wheel members, rotation of the rotary drive member thus causing rotation of the wheel members and thus causing rotation of the roller members, and means for rotation of the rotary drive member.

2. Curved section conveyor apparatus of the type having a pair of spaced-apart side members, each of the side members having an arcuate portion, the arcuate portion of each side member being concentric with the arcuate portion of the other side member, there thus being an inner side member and an outer side member, a plurality of elongate roller members each of the roller members being tapered, each of the roller members having a shaft portion extending from each end thereof, the shaft portions being rotatably supported by the arcuate portions of the side members as each of the roller members extends radially between the arcuate portions of the side members, each roller member having a smaller end adjacent the inner side member and a larger end adjacent the outer side member, the improvement comprising:

a rotary drive member rotatably disposed adjacent the inner side member, the rotary drive member having a coplanar annular surface concentric with the arcuate portion of the inner side member, the shaft portion of each of the roller members having an extending part extending through the inner side member to a position adjacent the annular surface of the rotary drive member, a plurality of wheel members in frictional engagement with the coplanar annular surface of the rotary drive member for rotation therewith, there being a wheel member carried by the extending part of the shaft portion of each of the roller members for rotation of the roller member with rotation of the wheel member, means carried by the extending part of each shaft portion for attaching its respective wheel member thereto, said means comprising a pair of abutment members carried by the shaft portion, the wheel member being disposed between the abutment members and in engagement therewith, at least one of the abutment members being axially adjustably movable with respect to the shaft portion, the wheel member being of elastomeric material so that adjustment of the axial position of said abutment member with respect to the shaft portion causes a change in the effective diameter of the wheel member.

References Cited
UNITED STATES PATENTS

| | | | |
|---|---|---|---|
| 1,271,590 | 7/1918 | Lefever | 74—194 |
| 1,440,536 | 1/1923 | Gill | 74—194 X |
| 2,622,720 | 12/1952 | Lorig | 198—127 |

EDWARD A. SROKA, *Primary Examiner.*

EVON C. BLUNK, *Examiner.*